(12) United States Patent
Lee

(10) Patent No.: US 10,883,733 B2
(45) Date of Patent: Jan. 5, 2021

(54) SYSTEM AND METHOD FOR A PORTABLE AIR CONDITIONER

(71) Applicant: Randal A. Lee, Marble Falls, TX (US)

(72) Inventor: Randal A. Lee, Marble Falls, TX (US)

( * ) Notice: Subject to any disclaimer, the term of this patent is extended or adjusted under 35 U.S.C. 154(b) by 0 days.

(21) Appl. No.: 16/667,743

(22) Filed: Oct. 29, 2019

(65) Prior Publication Data

US 2020/0063994 A1 Feb. 27, 2020

Related U.S. Application Data

(63) Continuation of application No. 15/838,113, filed on Dec. 11, 2017, now Pat. No. 10,458,664.

(60) Provisional application No. 62/436,976, filed on Dec. 20, 2016, provisional application No. 62/432,481, filed on Dec. 9, 2016.

(51) Int. Cl.
*F24F 5/00* (2006.01)
*F28F 21/06* (2006.01)
*F28F 21/08* (2006.01)

(52) U.S. Cl.
CPC ............... *F24F 5/0017* (2013.01); *F24F 5/00* (2013.01); *F24F 5/0021* (2013.01); *F28F 21/06* (2013.01); *F28F 21/084* (2013.01); *F24F 2221/12* (2013.01); *F28F 2275/065* (2013.01); *Y02E 60/14* (2013.01)

(58) Field of Classification Search
CPC .... F24F 5/0007; F24F 5/0025; F24F 2221/12; F24F 1/04; F24F 5/0021; F25D 3/08
See application file for complete search history.

(56) References Cited

U.S. PATENT DOCUMENTS

| | | | | |
|---|---|---|---|---|
| 2,304,804 | A * | 12/1942 | Crouch | F24F 5/0017 62/310 |
| 4,841,742 | A * | 6/1989 | Biby | B60H 1/3235 165/122 |
| 5,062,281 | A * | 11/1991 | Oliphant | F25D 3/08 62/457.1 |
| 5,197,301 | A * | 3/1993 | Holcomb | F24F 5/0017 62/457.1 |
| 7,603,875 | B2 * | 10/2009 | Carr | F24F 5/0017 62/457.7 |
| 7,748,235 | B1 * | 7/2010 | Franklin | F24F 5/0017 62/420 |

(Continued)

*Primary Examiner* — Eric S Ruppert
(74) *Attorney, Agent, or Firm* — Bell Nunnally & Martin LLP

(57) ABSTRACT

Systems and methods for portable air conditioners are shown. In accordance with one aspect of the present invention, a description of a design is provided for a portable air conditioning unit that uses a standard 5-gallon bucket and 20 pounds of ice. In some embodiments, a 24 VDC lithium ion battery pack powers a backwards curved impeller, which draws air into an intake plenum and down through draft tubes, up thru an impeller, which slings the air radially thru exhaust duct(s) and out onto the user(s). A single push button may be utilized to turn the fan on and off and select a fan speed. In some embodiments, a neoprene insulating sleeve may be applied to the outside of the 5-gallon bucket or may line the inside of the bucket. In some embodiments, up to 7 vent wedges may be installed to duct the cool air in selectable directions. In some embodiments, the vent wedges may be removed allowing the top to seat down lower increasing the velocity of the cool air exiting radially.

16 Claims, 14 Drawing Sheets

(56) References Cited

U.S. PATENT DOCUMENTS

2007/0044503 A1\* 3/2007 McCarrell ............. F24F 5/0017
                                                        62/420
2018/0073769 A1\* 3/2018 Herweck ............... F24F 5/0017

\* cited by examiner

22

24

SYSTEM AND METHOD FOR A PORTABLE AIR CONDITIONER

CROSS-REFERENCE TO RELATED APPLICATIONS

This patent application is a continuation of U.S. patent application Ser. No. 15/838,113, filed Dec. 11, 2017 entitled, "System and Method for a Portable Air Conditioner," which claims priority to U.S. Provisional Patent Application Ser. No. 62/432,481, filed Dec. 9, 2016, and 62/436,976, filed Dec. 20, 2016, both of which are hereby incorporated herein by reference.

BACKGROUND

Technical Field

This invention relates in general to the field of portable air conditioners, and more particularly, but not by way of limitation to systems and methods for a portable air conditioner.

Background

Ice has been used for millennia for cooling so there is much available data on how much energy heat ice can absorb when it melts. In fact, the unit of measure for today's air conditioners is based on the amount of energy one ton (2,000 pounds) of ice can absorb. 2,000 pounds of ice can absorb 288,000 BTU/24 hr or 12,000 BTU/hr, which is accepted as one ton of cooling capacity. Put another way, one ton of cooling capacity is equivalent to melting 83.33 pounds of ice an hour. The currently available portable coolers are either relatively elaborate and expensive or are relatively simply and ineffective. For example, portable air conditioning units utilizing a conventional compressor, evaporator, and blower fan to effect cooling are expensive and cumbersome. Portable air conditioners that merely utilize a fan to moisturize air are inexpensive, but do not provide sufficient cooling capacity. Thus, a lightweight, portable, ice based air conditioner with a high cooling capacity may find application and utility in the market place. Thus, there is a need for an improved portable air conditioner.

As such, it may be appreciated that there is a continuing need for a new and improved portable cooler apparatus wherein the same addresses both the problems of ease of use, as well as effectiveness in construction and in this respect, the present invention substantially fulfills this need.

SUMMARY OF THE INVENTION

In accordance with the present invention, systems and methods for portable air conditioners are shown. In accordance with one aspect of one embodiment, a description of a design is provided for a portable air conditioning unit that uses a standard 5-gallon bucket and 20 pounds of ice. In some embodiments, a 24 VDC lithium ion battery pack powers a backwards curved impeller, which draws air into an intake plenum and down through draft tubes, up through an impeller, which slings the air radially through exhaust duct(s) and out onto the user(s). A single push button may be utilized to turn the fan on and off and select a fan speed. In some embodiments, a neoprene insulating sleeve may be applied to the outside of the 5-gallon bucket or may line the inside of the bucket. In some embodiments, up to seven vent wedges may be installed to duct the cool air in selectable directions. In some embodiments, the vent wedges may be removed allowing the top to sit lower increasing the velocity of the cool air exiting radially.

The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
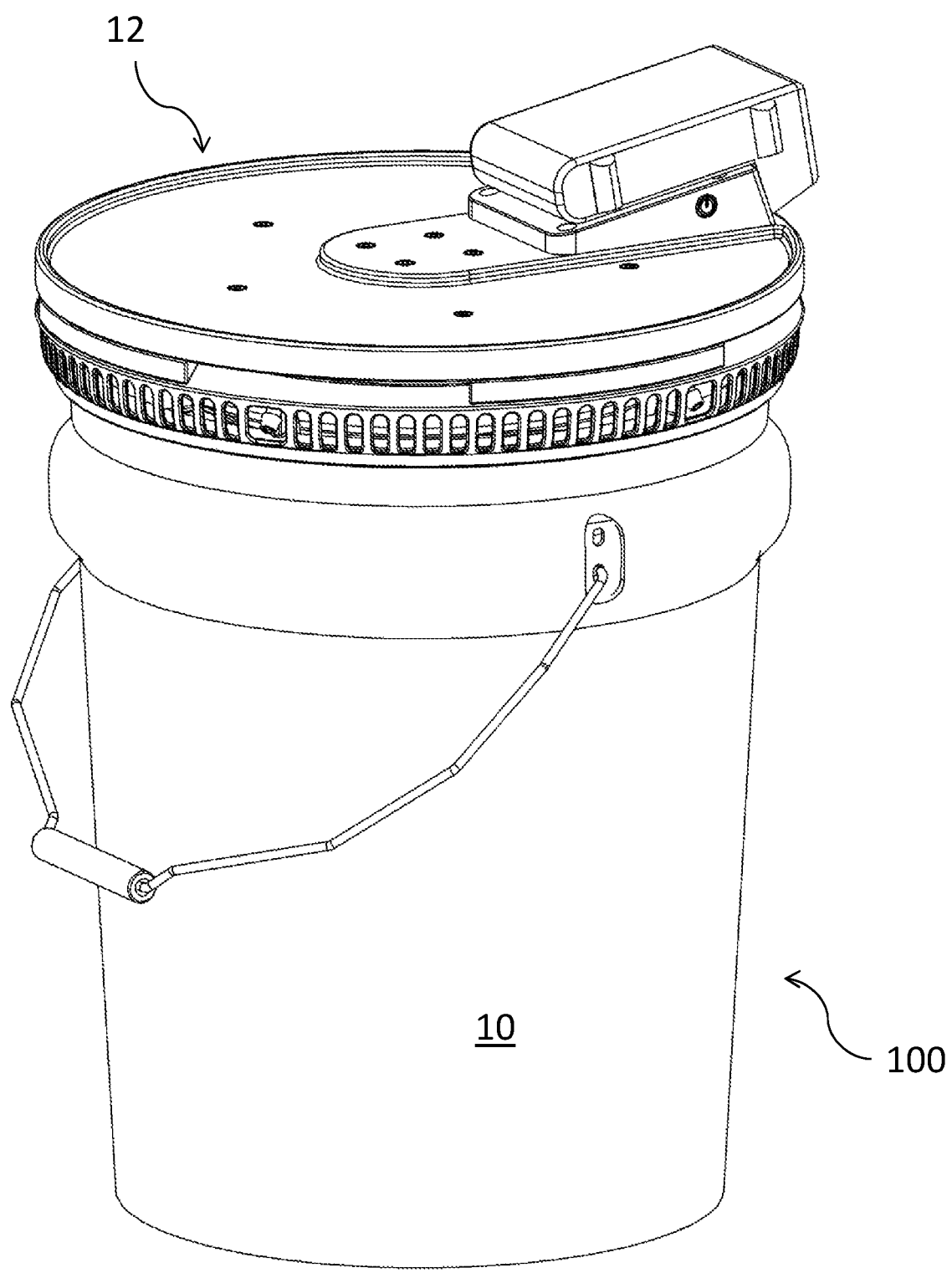
FIG. 1 illustrates a portable air conditioner of one embodiment of the present invention.
Figure 2:
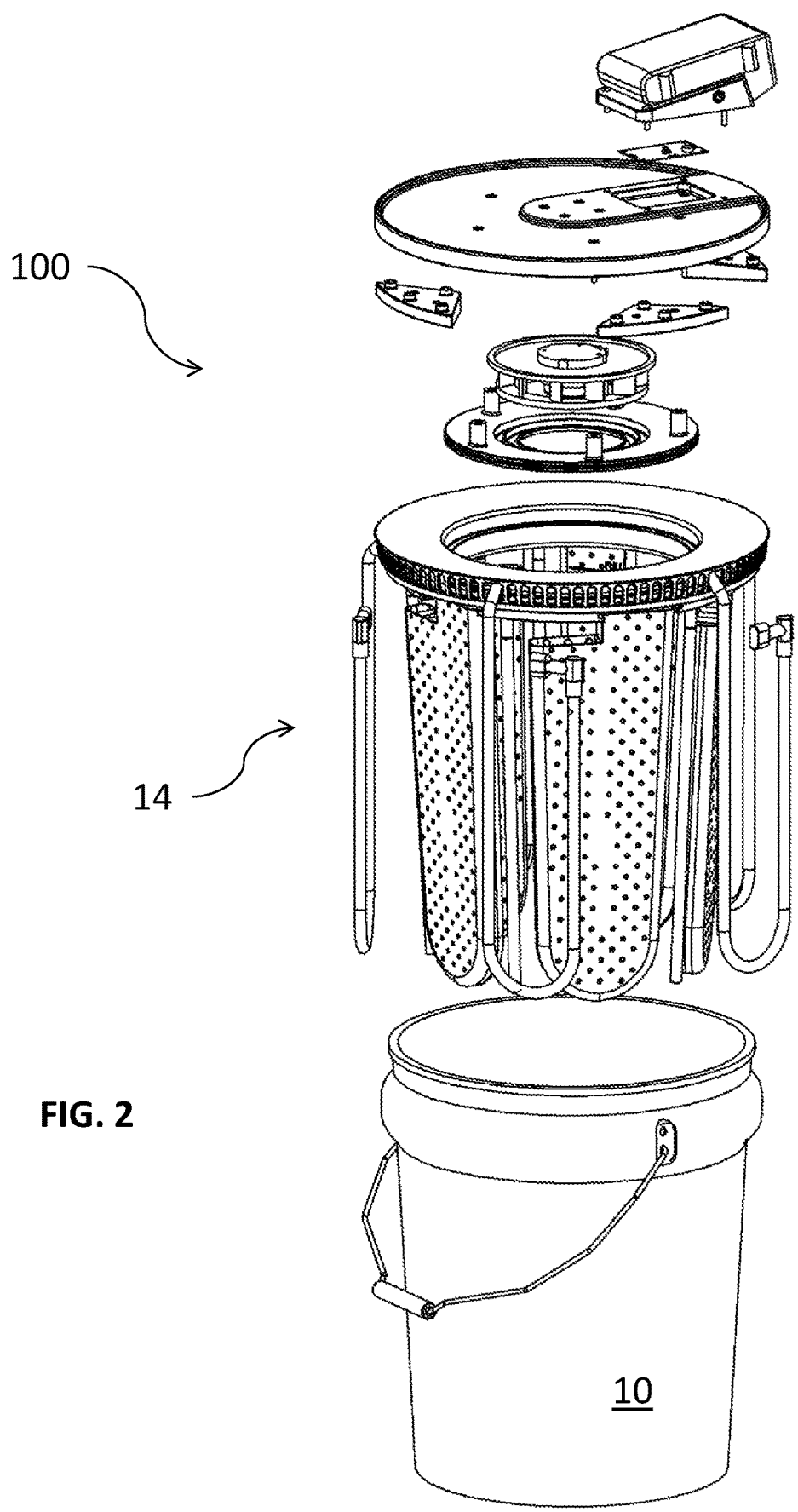
FIG. 2 is an exploded view of the portable air conditioner of FIG. 1.
Figure 3:
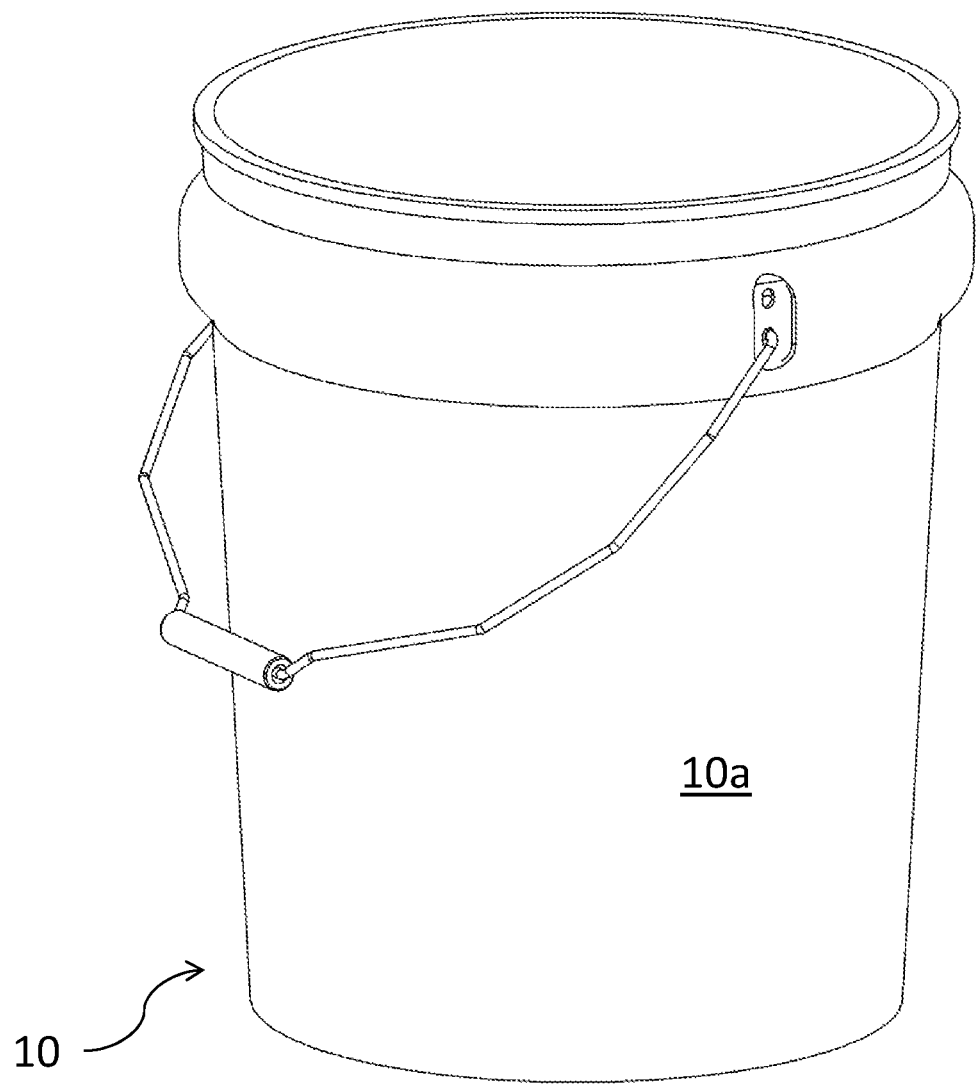
FIG. 3 illustrates an insulated bucket of the portable air conditioner of FIG. 1.

FIG. 1 shows an assembled portable air conditioner 100 according to an embodiment of the present invention. FIG. 2 shows an exploded view of the portable air conditioner 100 of FIG. 1. In the embodiment shown, the portable air conditioner 100 includes a bucket 10, such as a five gallon bucket, an intake plenum 14 assembly, and a lid 12 assembly. FIG. 3 is an illustration of a bucket 10 with an insulating koozie 10a around an outer portion thereof. The insulating koozie 10a may be made from two identical pieces of 3 mm thick neoprene koozie material, butt joined and sewn together. The exterior layer could be pile loops to allow for hook type of accessory connection as shown below with the drinking tubes. The koozie 10a could incorporate a radiant barrier to improve performance under the sun. This radiant barrier could be a metalized Mylar layer bonded between the neoprene and the pile loop exterior layer. As can be seen, the koozie could be installed onto a standard 5-gallon bucket.

The koozie 10a provides insulation to reduce the heat transfer through the exterior surface of the bucket 10. The koozie 10a may also help to keep condensation from forming on an outer surface of the bucket 10 by moderating the temperature deltas. The koozie 10a may provide a surface for trade dress or promotional content. The koozie 10a may have pockets or pouches sewn thereon for storage (not shown). In some embodiments, a longer handle than one that is included in a standard off-the-shelf bucket may be utilized to account for the height of the lid assembly. In other embodiments, the koozie 10a may be a spray foam and/or may line the inside of the bucket 10.

Figure 4A:
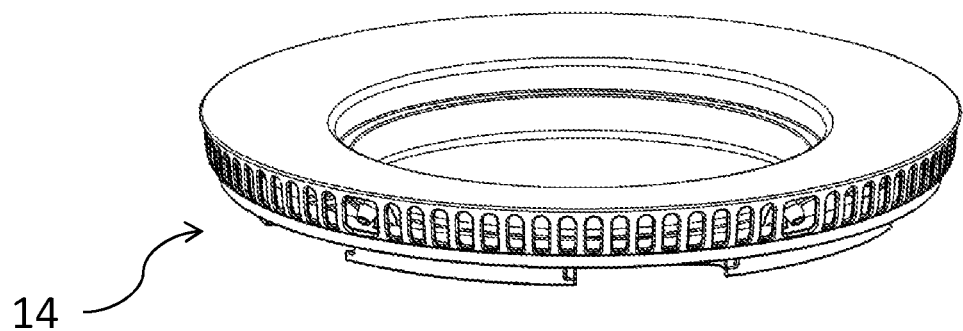
FIG. 4a-4c illustrate perspective, side, and bottom views of a lid of the portable air conditioner of FIG. 1.
Figure 4B:
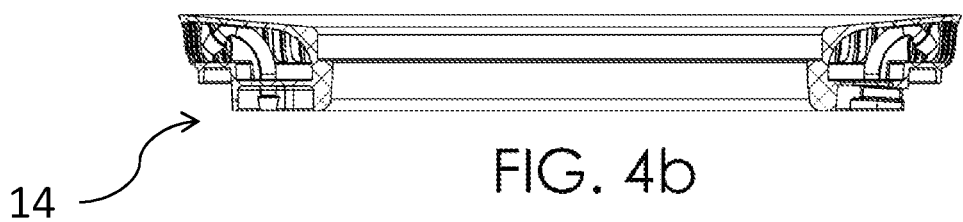
Figure 4C:
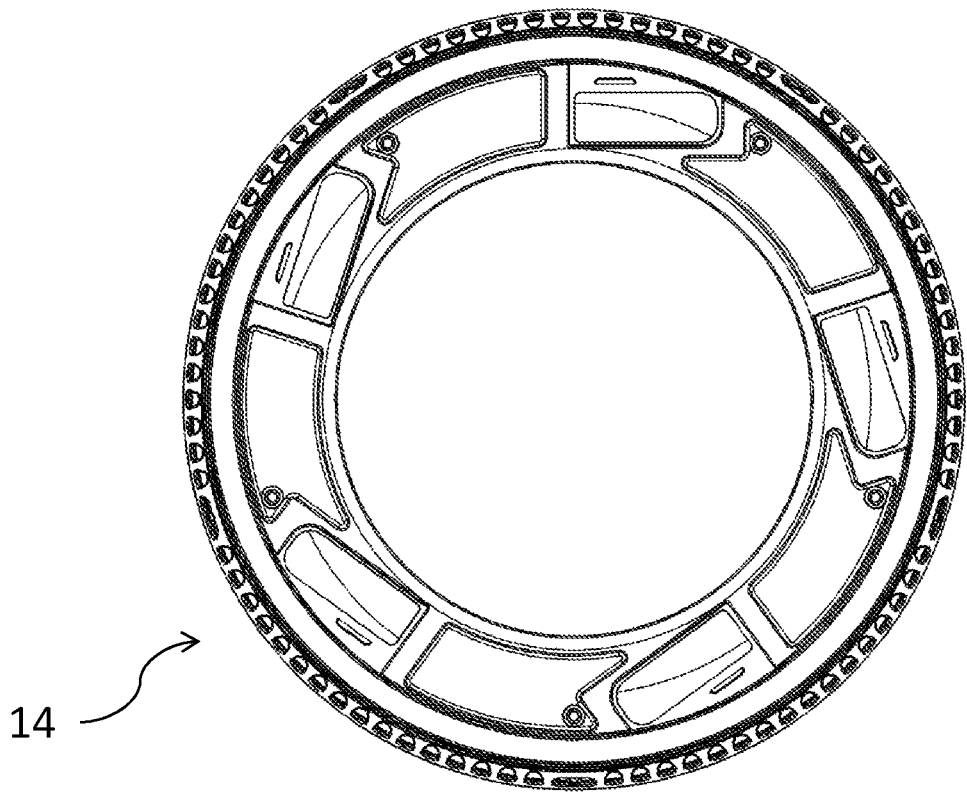

FIGS. 4a-4c illustrate perspective (FIG. 4a), side (FIG. 4b), and bottom (FIG. 4c) views of an intake plenum 14 of the portable air conditioner of FIG. 1. FIG. 4b is a section view of the intake plenum 14. FIG. 4c shows the lower surfaces of the intake plenum 14 showing the openings where the draft tubes (not shown) connect. In the embodiment shown, the intake plenum 14 has connections for five draft tubes. In other embodiments, the intake plenum 14 may include more or less draft tube connections. In the embodiment shown, the intake plenum 14 has a plurality of openings around an outer edge of the intake plenum 14 to allow for enough air flow to meet the needs of the impeller (not shown), while maintaining structural integrity. In some embodiments, the intake plenum 14 may be formed from two injection molded plastic pieces sonically welded together. The intake plenum 14 also allows for the draft tubes to be removably attached allowing for a more compact shipping and handling when disassembled. In some embodiments, the intake plenum 14 may include slots for receiving drinking tubes with barbed ends may be arranged around a lower surface of the intake plenum and snapped into place. In the embodiment shown, up to five straws made of flexible tubing may be attached and extend down into the bucket 10 of ice/water to allow users to drink the ice water.

Figure 5A:
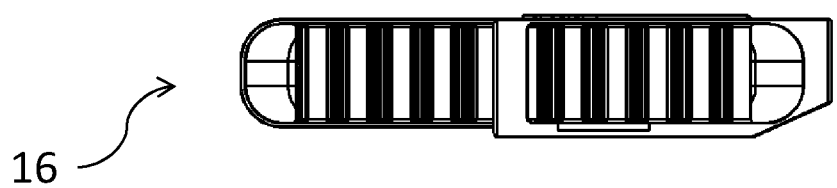
FIGS. 5a-5c illustrate a top and two side views of draft tubes of the portable air conditioner of FIG. 1.
Figure 5B:
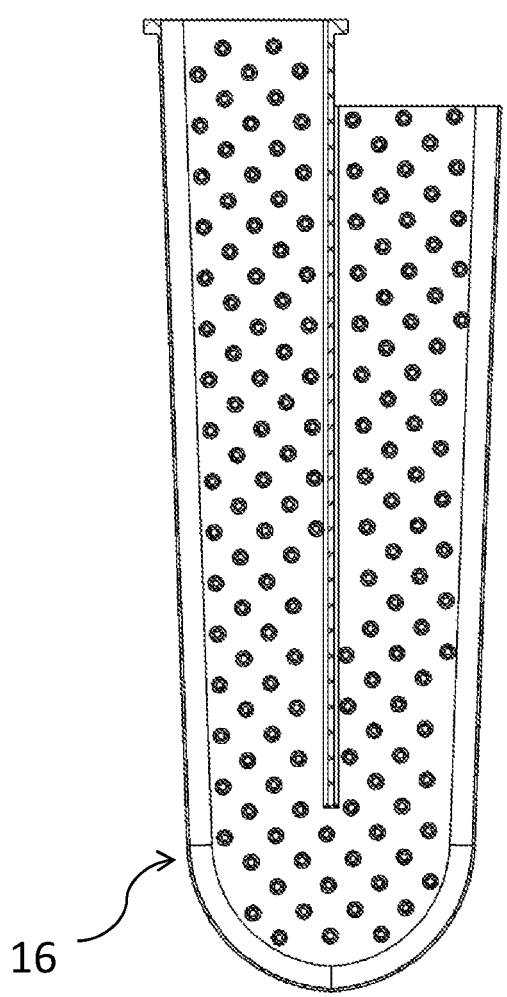
Figure 5C:
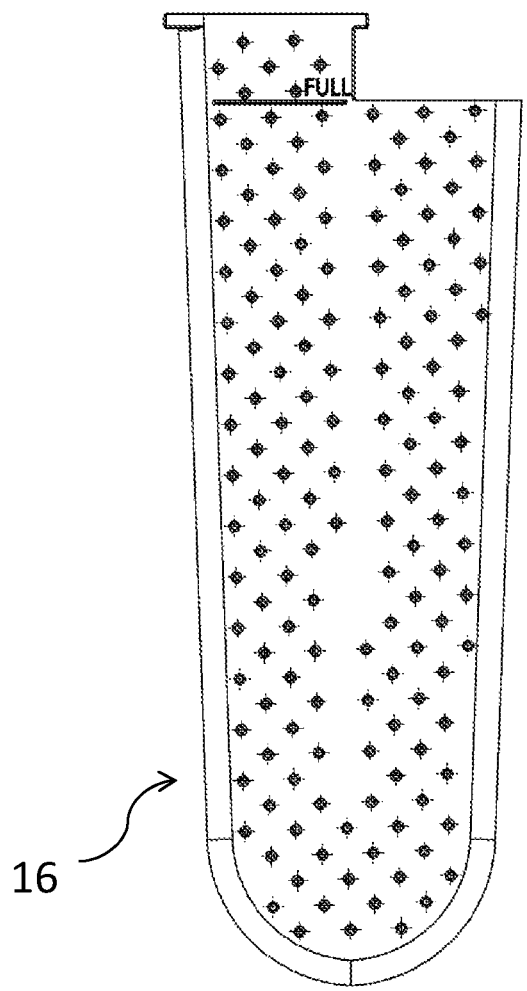
Figure 6:
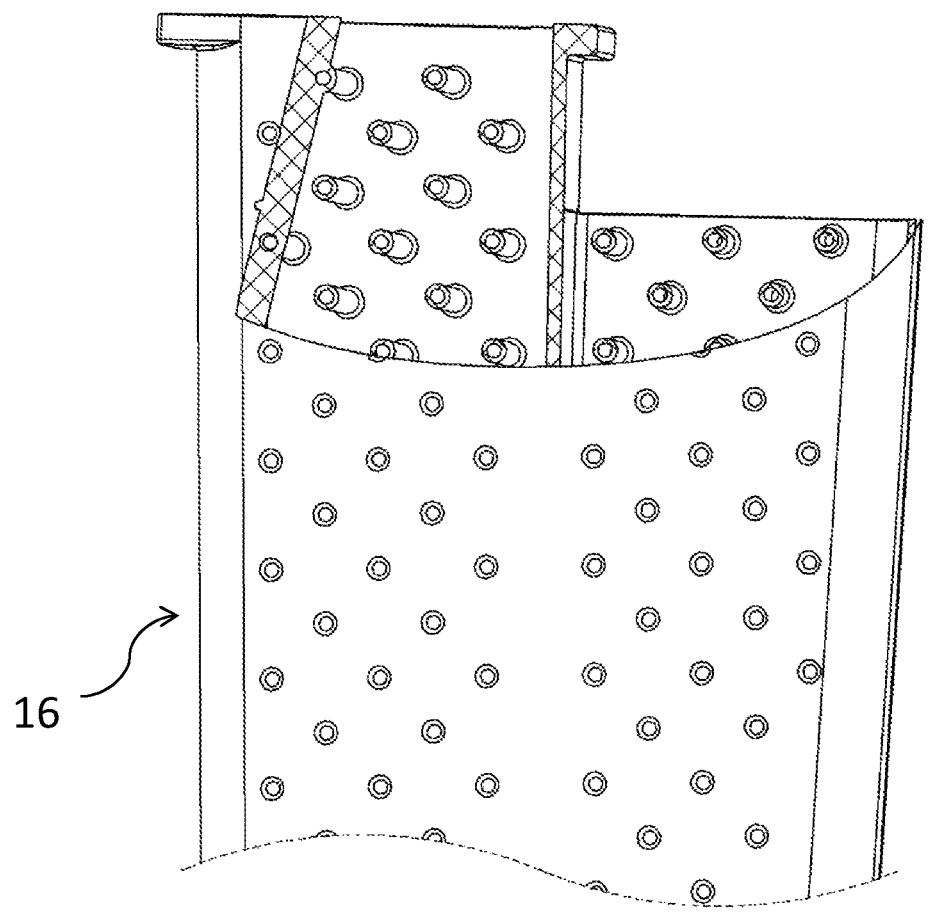
FIG. 6 illustrates a cut-away view of the draft tubes of FIG. 5b.
Figure 6:
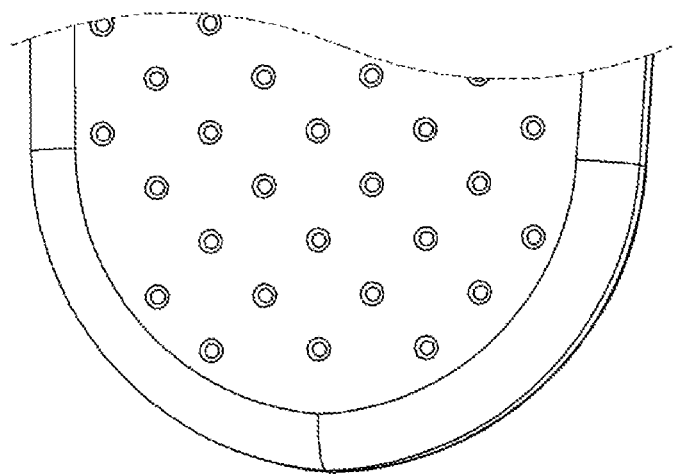
Figures 7A, 7B:
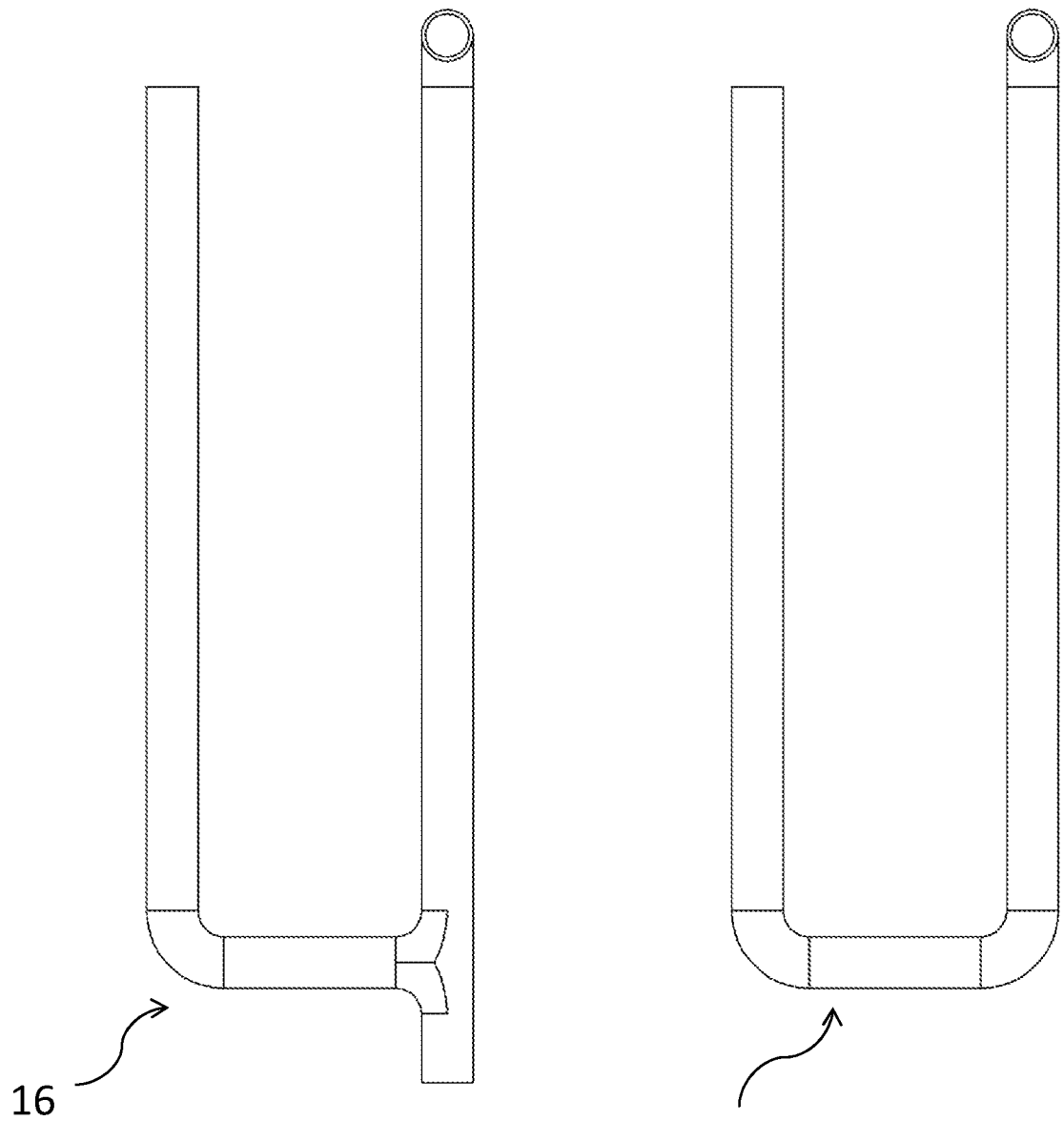
FIGS. 7a and 7b illustrate alternative embodiments of draft tubes for use in a portable air conditioner.

FIGS. 5a-5c illustrate a top and two side views of draft tubes 16 for use in the portable air conditioner of FIG. 1. In some embodiments, the draft tubes 16 may be made from high thermal conductivity material, such as high thermal conductivity plastic, metal, alloy, cast aluminum, or other material. In other embodiments, copper may provide better conductivity, but may be more expensive. In some embodiments, the plastic draft tubes 16 may be formed from two pieces of injection molded plastic sonically welded together. For plastics, the thermal conductivity may be between 0.1 to 10 Watts per Meter-Kelvin (W/m*K). For aluminum, the thermal conductivity may be 200 W/m*K or higher. For plastics to work well, the distance between the cooling fluid (e.g., ice, water, gel, or other substance) and the air flowing therethrough needs to be minimized. The distance between the cooling fluid and the air may be reduced by having supporting structures between the walls of the draft tube 16 to allow for reduced wall thickness. The distance may also be reduced by cutting channels through the supporting structures to allow the cooling fluid to travel therethrough. As can be seen in FIGS. 5a-5c, in various embodiments, supporting structures within the draft tubes 16 may also increase the surface area of contact between the flowing air and the draft tube 16, improving the heat transfer between the air and the draft tube 16 and between the draft tube 16 and the ice (not shown). In this embodiment, the surface area internal to the draft tube 16 may exceed 1 sq.-ft. per tube. In this embodiment, the many pin fins within the draft tubes 16 increase the turbulence of the flowing air and improve the convection heat transfer between the air and the draft tube 16, which leads to improved heat transfer from the air. In various embodiments, the shapes of these surfaces may be varied. FIG. 6 illustrates a close up view of the draft tube 16 of FIG. 5b. This sectional view shows the hollow supporting structures or extended surfaces. Since they are hollow, the coolant is a wall thickness away from the surface where the convection heat transfer takes place. These structures also increase the turbulent flow of the air improving mixing and convective heat transfer. These holes also increase the surface area for the conduction heat transfer. FIGS. 7a and 7b illustrate alternative embodiments of the draft tubes 16 of FIGS. 5b-5c. The draft tubes 16 may experience condensation and, thus, may incorporate a condensation trap as seen in the draft tube 16 shown in FIG. 7a. The formation of condensation is the evidence of the dehumidification of the conditioned air.

Figure 8A:
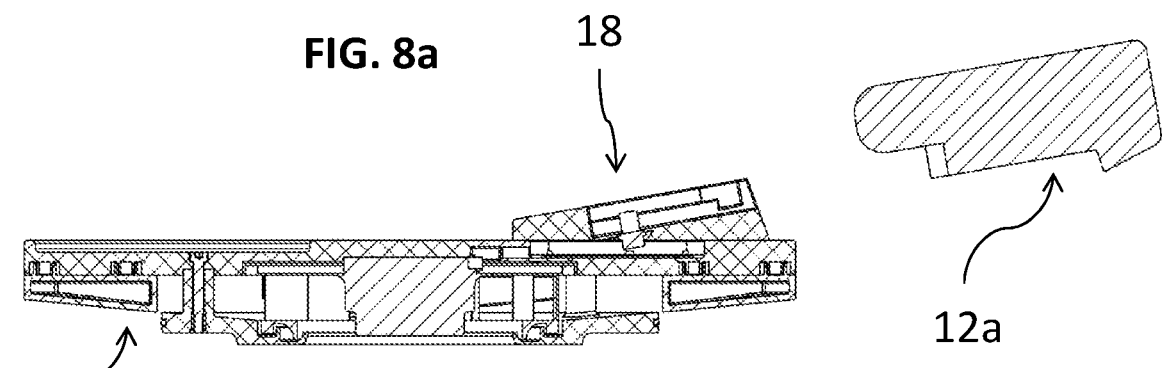
FIGS. 8a and 8b illustrate side and top views of a lid of the portable air conditioner of FIG. 1.
Figure 8B:
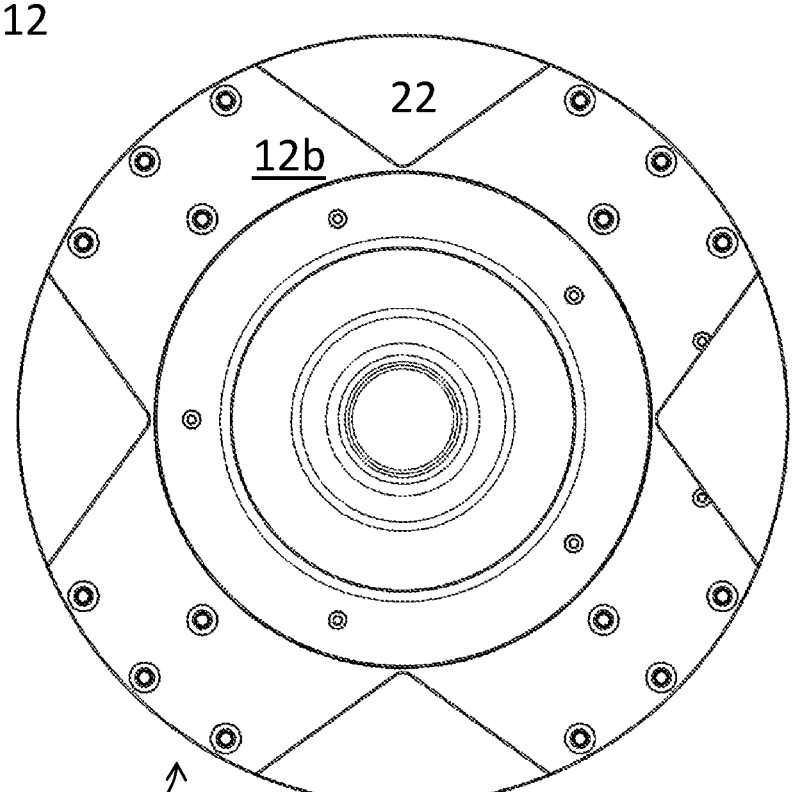
Figure 8B:
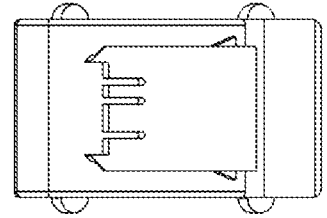

FIGS. 8a and 8b illustrate side and top views of a lid 12 of the portable air conditioner of FIG. 1. FIG. 8a shows a section view through the lid 12 assembly. In the embodiment shown, the impeller is located interior of the annular exhaust plenum 12b formed by the lower surface of the lid 12 assembly and the top surface of the intake plenum (not shown). This exhaust plenum 12a is shaped in such a way to gradually constrict the air as it exits the impeller and travels through the exhaust plenum 12b. Accelerating the cool air helps to keep it cool and increases the velocity of the air giving it increase range as it exits the portable air conditioner 100. The battery adapter 18 on top allows for a battery pack 12a to be removably secured. Four vent wedges 22 can be seen installed on the underside of the top assembly as shown in FIG. 9b. In various embodiments, the vent wedges 22 can be installed into a plurality of different locations to configure the desired flow paths.

Figure 9:
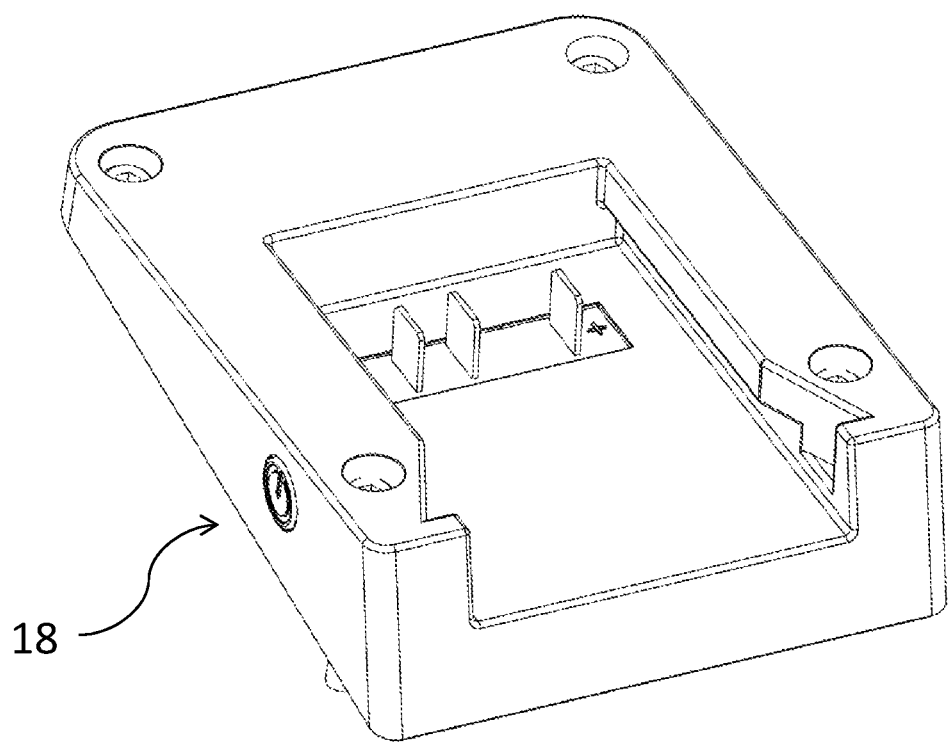
FIG. 9 illustrates a perspective view of a battery adapter of the portable air conditioner of FIG. 1.

FIG. 9 illustrates a perspective view of a battery adapter 18 of the portable air conditioner of FIG. 1. In various embodiments, a molded plastic interface may be provided between the portable air conditioner 100 and a commercial batter back, such as a lithium-ion battery pack. This may help avoid the liability and shipping and handling complications associated with battery packs, such as lithium-ion battery packs. A universal adapter can be included or a different adapter can be developed to adapt any manufacturer's batter pack to the air conditioner. The battery adapter 18 may house the LED lighted push button control for the portable air conditioner 100. In some embodiments, an LED will light and/or flash for each of the operating states. For example, the button may be presses one time for the air conditioner to turn on to low and the LED may flash green or a single LED may light up. A second push of the button may turn the air conditioner to medium and the LED may flash yellow and/or two LEDs may light up. A third push of the button may turn the air conditioner to high and the LED may flash blue and/or three LEDs may be lit. A fourth push of the button may turn the unit off and the LED may flash red or cease flashing. In various embodiments, the battery adapter may have the electrical contacts and features that allow the pack to snap in for secure operation. The battery adapter 18 may include a connection to facilitate receipt of power from a wall outlet or other power source for a battery free operation and/or to charge the battery.

Figure 10:
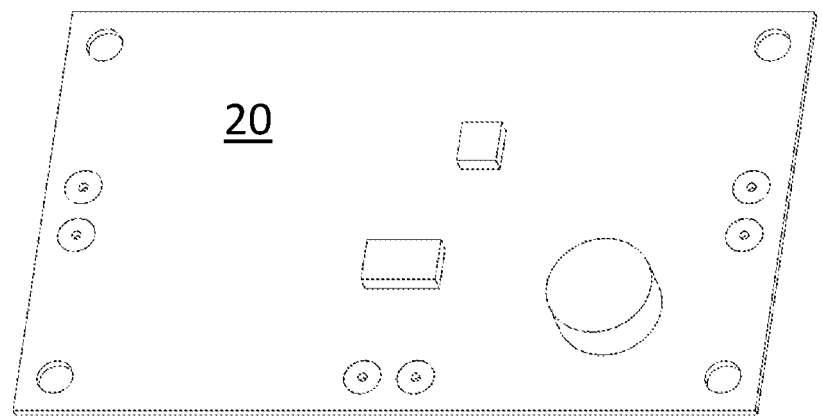
FIG. 10 illustrates a perspective view of a switching power supply of the portable air conditioner of FIG. 1.

FIG. 10 illustrates a perspective view of a switching power supply 20 of the portable air conditioner 100 of FIG. 1. A low cost switching power supply 20 may be used to create variable speeds, such as the three speeds and LEDs described above. In some embodiments, its dimensions may be approximately 1.5"×2.5" with outputs of 12 VDC, 18 VDC, and/or 24 VDC. In some embodiments, it may be adapted to receive an input of 24 VDC from a 2 Ah lithium ion battery pack. Push button switch with LEDs may be included. In some embodiments, the switching power supply 20 may include logic configured to receive button pushes to, for example, turn the unit on to low, medium, high, and off and to control the indicator lights. In an alternative embodiment, a lower cost solution may include a controller configured to switch impedance in series with the motor and use a multi-pole switch.

Figure 11:
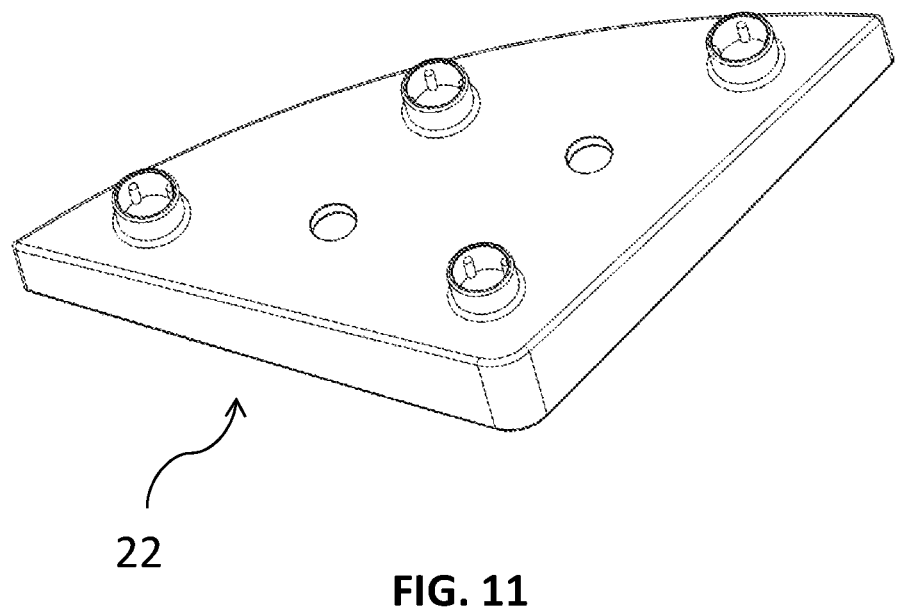
FIG. 11 illustrates a perspective view of a vent wedge of the portable air conditioner of FIG. 1.

FIG. 11 illustrates a perspective view of a vent wedge 22 of the portable air conditioner 100 of FIG. 1. Vent wedges 22 may be used to fill the space and direct the flow of cool air inside the exhaust duct. The vent wedge 22 may be pushed into place in, for example, up to eight locations using, for example, a pin and socket assembly. By filling the volume with a vent wedge 22 instead of just blocking the opening, the vent wedge 22 helps to maintain the velocity of the exhausting cool air.

Figure 12:
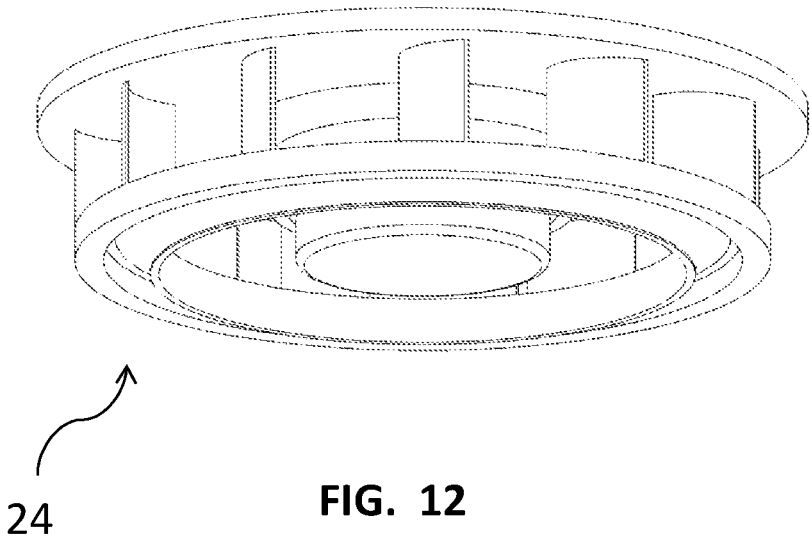
FIG. 12 illustrates a perspective view of a curved impeller of the portable air conditioner of FIG. 1.

FIG. 12 illustrates a perspective view of a curved impeller 24 of the portable air conditioner 100 of FIG. 1. In the embodiment shown, the curved impeller 24 is a low power backwards curved impeller configured to receive a 12-28 VDC input. In some embodiments, the impeller 24 may be replaced with higher or lower flow fans and higher or lower noise fans, which may provide cost or performance advantages depending on the requirements. The curved impeller 24 is relatively quiet and has a good pressure drop capability to pull the air through the intake plenum (not shown) and the draft tubes (not shown). In various embodiments, an axial flow fan may be utilized. In some embodiments, a centrifugal blower may be utilized that intakes the air along the axis of rotation and slings the air radially. In various embodiments, the fan may be located in an internal portion of the air conditioner and not at the intake or the exhaust of the air circuit. In the embodiment shown, there is an intake plenum in front of the fan and an exhaust plenum behind it in the air circuit.

Figure 13:
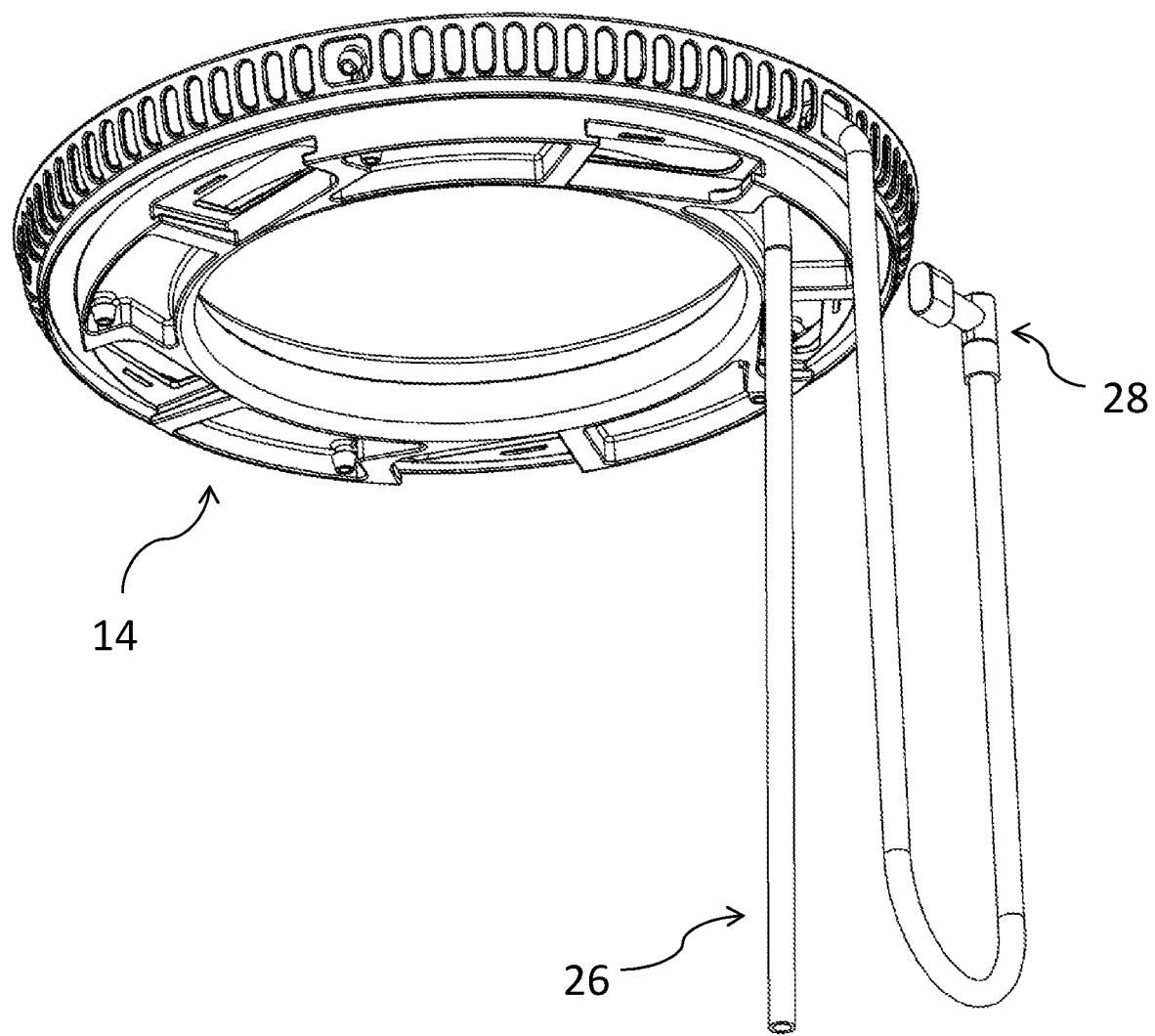
FIG. 13 illustrates a perspective view of a drinking straw for use with the portable air conditioner of FIG. 1.
Figure 14A:
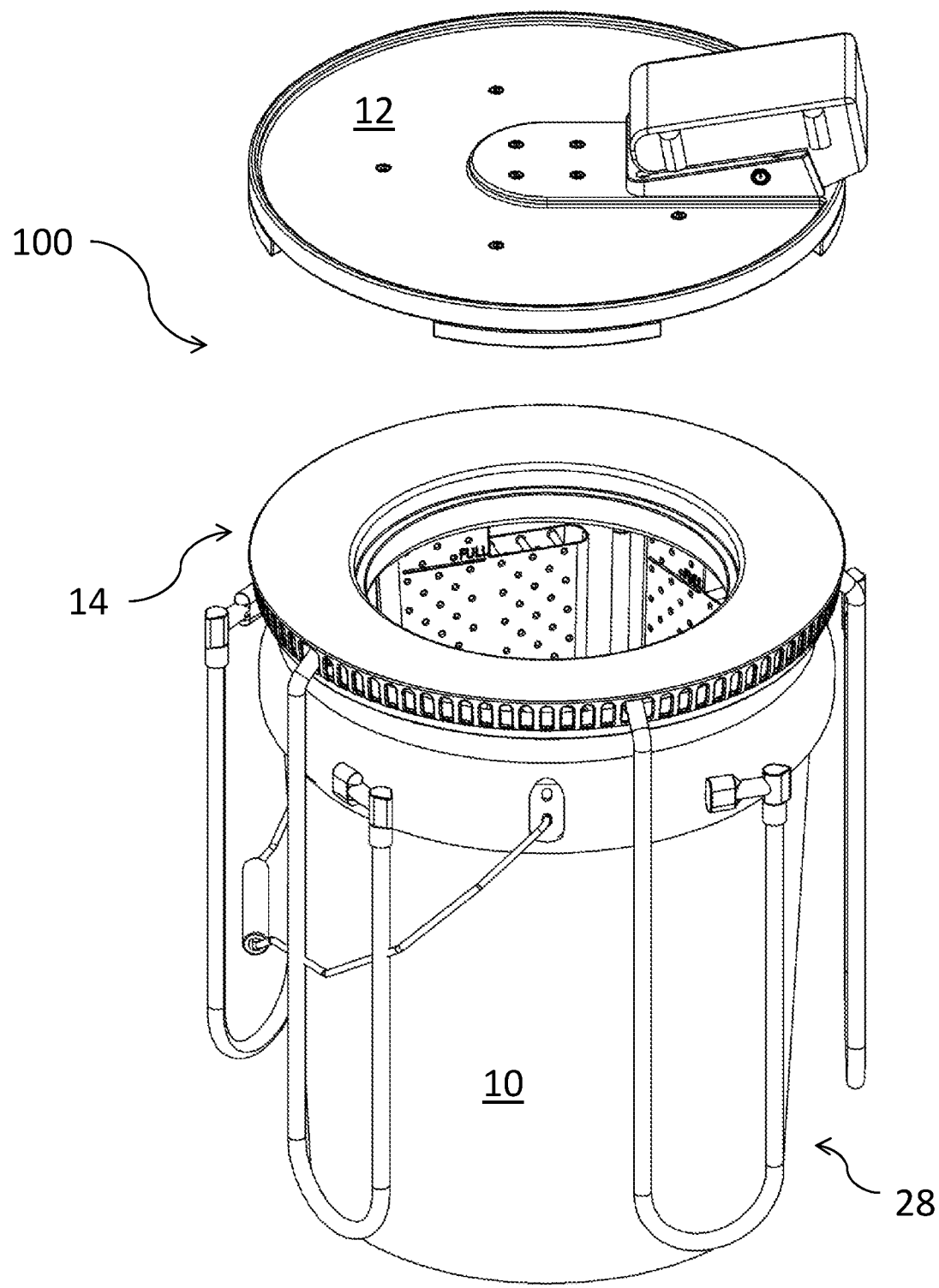
FIGS. 14a and 14b illustrate top and bottom perspective views of a portable air conditioner having a removed lid and drinking straws.
Figure 14B:
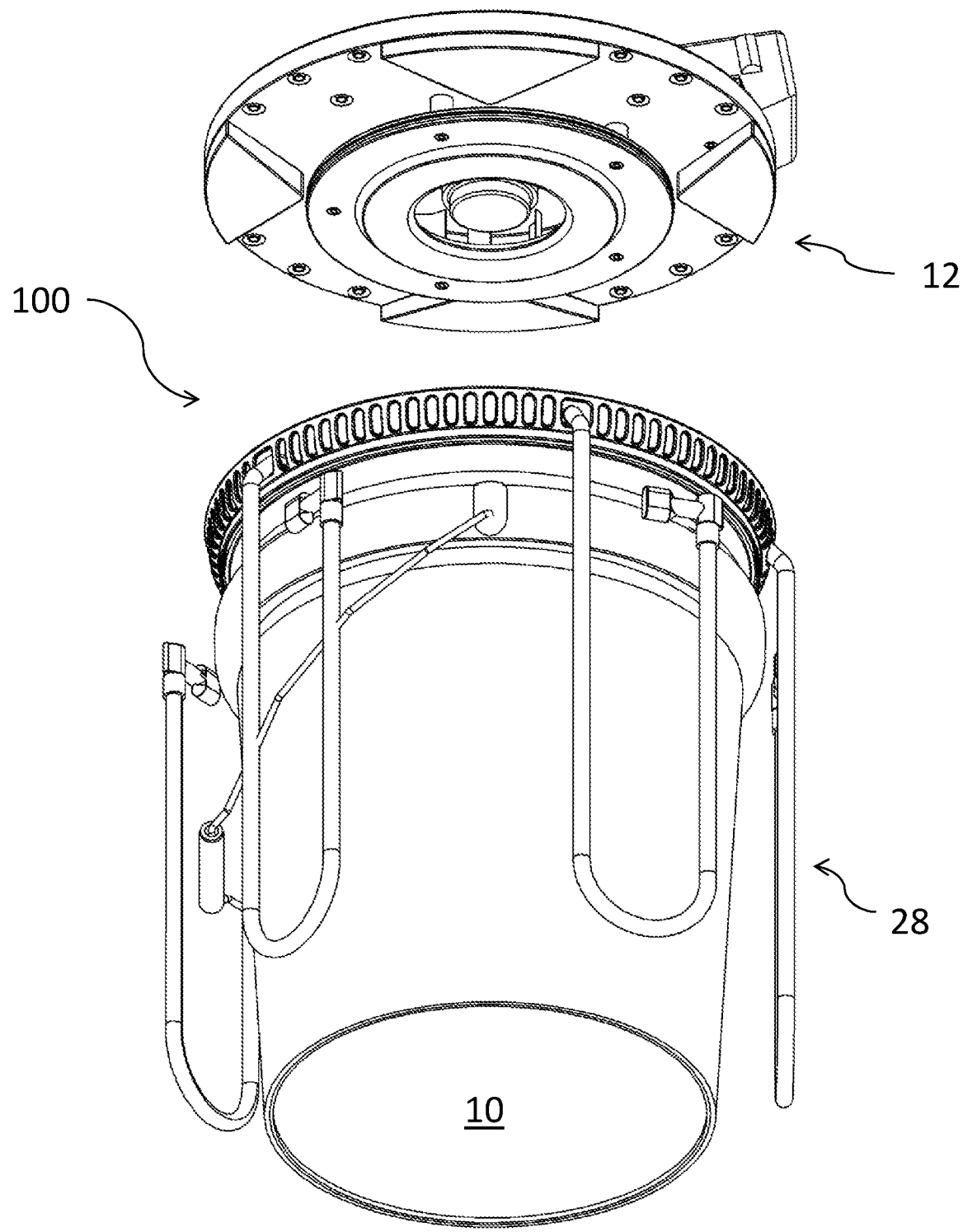

FIG. 13 illustrates a perspective view of a drinking straw 28 for use in an embodiment of a portable air conditioner. The drinking system is comprised of a straw 26, which attaches to the underside of the intake plenum 14 and extends down into the ice water. A hose or drinking tube 28 can be attached and extend outwardly to allow a user to draw drinking water from the bucket (not shown). The tube or straw may include a check valve to prevent the contents of the tube from being sucked back into the bucket 10. The drinking tube 28 might have a ring of hook material near the mouthpiece to allow the drinking tube 28 to be stuck to the pile on the side of the bucket 10 to keep it off the ground. The drinking tube 28 might be designed to accept disposable mouthpieces for communal use. The drinking tube 28 could also be used to siphon the water out. FIGS. 14a and 14b illustrate perspective views of an assembled portable air conditioner 100 having a removed lid 12 with an intake plenum 14 having drinking tubes 28 disposed at a plurality of locations around the bucket 10. The intake plenum and draft tube assembly may be placed onto a standard five gallon bucket with an insulating koozie around an inner or outer surface thereof. In other embodiments, the top assembly comprising the lid assembly and the intake plenum assembly may be attached to a water cooler. Approximately 20 pounds of crushed ice may be poured in through the opening in the intake plenum. The top assembly is placed on top and seals to the intake assembly with the integral O-ring. In embodiments with a variable speed fan, pressing a button once will turn it on to low, twice will turn it to medium flow, three time will turn it to high flow, and four presses turns the unit off.

Figure 15:
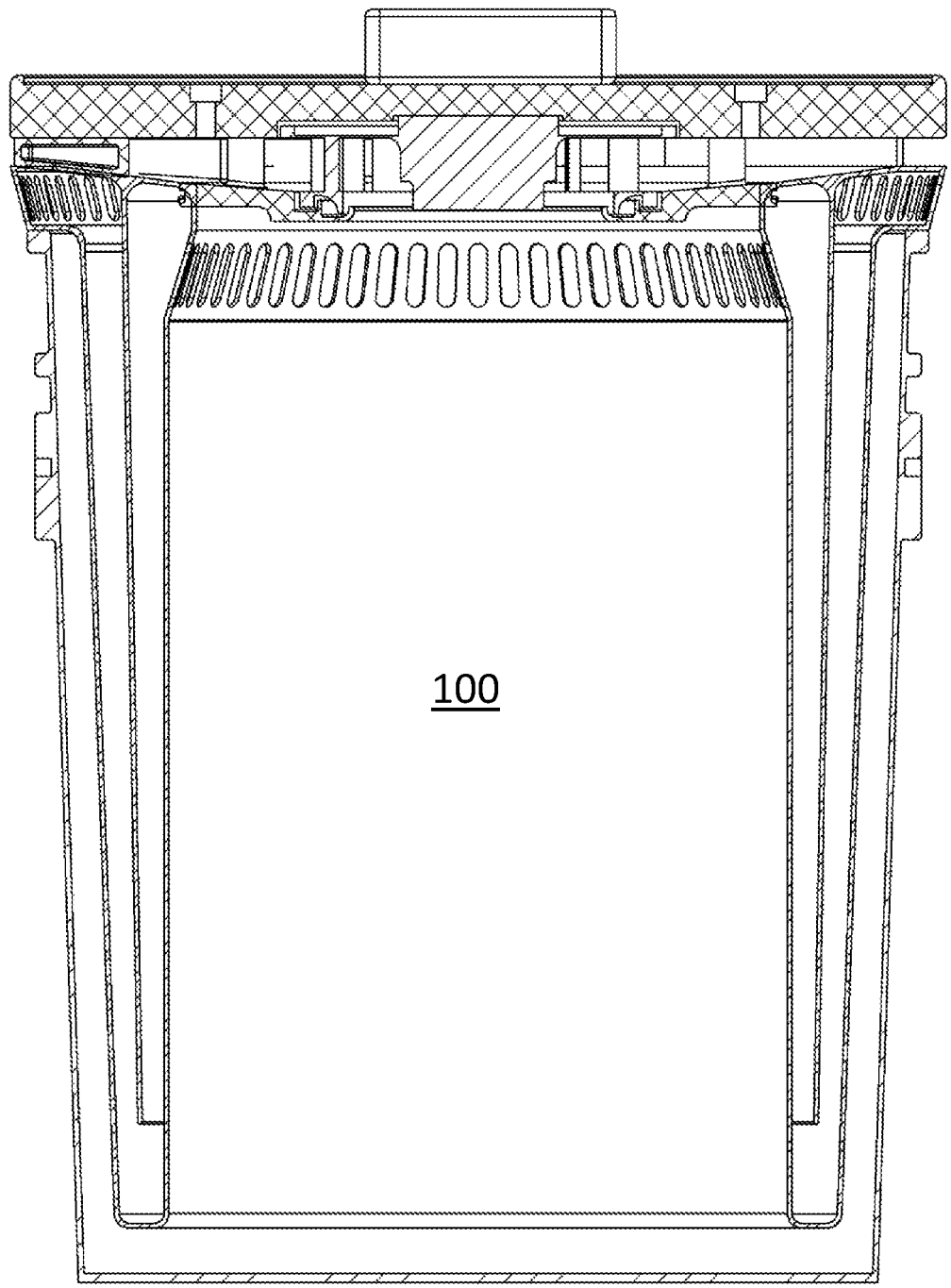
FIG. 15 illustrates a perspective view of an alternative embodiment of a portable air conditioner having a coaxial draft tube.

FIG. 15 illustrates a side sectional view of an alternative embodiment of a portable air conditioner 100 having a coaxial draft tube. The section view seen shows a coaxial embodiment of the draft tube. The air enters the annular intake plenum and flows down and up into the ice vault. While this embodiment may allow an increased amount of airflow, other factors, such as heat transfer capacity and compactness in shipping and handling may also vary.

In operation, heat may be absorbed from the outside air and conducted through the walls of the draft tube as the air flows down and up through each draft tube immersed in an ice bath. For heat conduction: $Q/t=kA(T1-T2)/d$, where Q is heat conduction per time, d is wall thickness, k is thermal conductivity, A is area, and T are temperatures on either side of the wall. In one exemplary embodiment, the total surface are for conduction is 5.65 ft^2; the thermal conductivity for plastic is approximately 0.20 BTU/(hr*ft*° F.); the wall thickness is approximately 0.040"; and the ice water is 32° F. With an outside ambient temperature of 85° F., this would yield, for example, a conduction heat transfer rate of approximately 12000 BTU/hr or approximately one ton of cooling capacity. This yield will be lowered in a real world setting because, for example, not all of the surface area will be fully utilized.

In operation, another consideration is the heat capacity of the flowing air. For example, is the mass air flow high enough to transfer that amount of energy? For a fan that moves 400 cubic feet per minute, in one hour it would move 24,000 cubic feet of air or 1,800 pounds of air. Assume a 30° F. temperature delta as the air flows through the draft tubes. $E=mCp*(T1-T2)$ Where E is energy, m is mass, Cp is specific heat of air, and T are the temperatures before and after the air conditioner. E=12,960 BTU for an hour or one ton of cooling capacity. Again, there are real world factors that will temper this result, but it suggests a portable one ton air conditioner may be feasible with a simple apparatus that weighs less than 10 pounds, excluding the ice.

In various embodiments, the portable air conditioner may use an intake plenum to increase the intake area. In various embodiments, the portable air conditioner may use draft tubes that have the intake and exhaust above the water line. In various embodiments, the portable air conditioner may use extended surfaces or supporting structures inside the draft tubes (water to air heat exchanger) to improve the heat transfer, because of the increased surface area of heat exchanger that is in contact with the air and the extended surfaces, in this case pin fins, tend to increase the turbulence improving the convection heat transfer between the flowing air and the surface of the draft tube, and because the wall thickness of the draft tube can be minimized because of the mechanical support. The thinner the plastic, the better the heat transfer. In various embodiments, the portable air conditioner may use hollow pin fins that bring the coolant to within a wall thickness away (0.040" as in this embodiment) from the air. If the pin fins are solid, the middle of the pin fin in this embodiment is 0.46" away from the coolant and the heat must be conducted through this distance to exchange with the coolant. Note the 0.040" wall thickness is a limitation of the laser sintering process to produce this embodiment. Other manufacturing techniques may allow for even thinner wall thicknesses if they are supported with supporting structures. In various embodiments, the portable air conditioner may use thermally conductive plastic for the draft tubes. In various embodiments, the portable air conditioner may use cast aluminum for the draft tubes. In various embodiments, the portable air conditioner may use an internal fan, that is, one which has ducting in front of the fan, i.e., the intake plenum, and on the exhaust side of the fan, i.e., the exhaust plenum. In various embodiments, the portable air conditioner may use a backwards curved impeller, which provides a high pressure drop and, because the impeller turns the air 90 degrees, without duct losses to turn the air 90 degrees. In various embodiments, the portable air conditioner may use a battery adapter for use with a variety of third party battery vendors. In various embodiments, the portable air conditioner may use constricting exhaust ducts to accelerate the cool air upon exiting the impeller increasing the range of the cool air. In various embodiments, the portable air conditioner may use snap-in draft tubes that allow for a compact disassembled unit for shipping and handling. In various embodiments, the portable air conditioner may use a condensate trap on the draft tubes. In various embodiments, the portable air conditioner may dehumidify the air. In various embodiments, the portable air conditioner may use an insulating koozie with a loop pile exterior and radiant barrier. In various embodiments, the portable air conditioner may include drinking tubes incorporated into the lid. In various embodiments, the portable air conditioner may be of a coaxial design made of either plastic or metal material.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. A portable air conditioning system comprising:
   a bucket having an upper peripheral edge defining an opening into an interior space of the bucket;
   an intake plenum configured to be removably connectable to the upper peripheral edge of the bucket and having a plurality of air entry openings and a plurality of ducts coupling the air entry openings to the interior space of the bucket;
   wherein one or more of the plurality of ducts comprise a condensation trap on a lower portion thereof;
   a lid configured to be removably coupled to the intake plenum and having a lower surface, wherein, when the lid is coupled to the intake plenum, the lower surface of the lid and an upper surface of the intake plenum form air exit channels;
   a blower connected to a surface of the lid, the blower configured to pull air from the interior space of the bucket and push the air through the air exit channels to an exterior of the bucket; and
   wherein, when the intake plenum is connected to the bucket and the lid is coupled to the intake plenum, an intake flow path is formed such that air entering the air entry openings passes through the ducts before reaching the interior space of the bucket.

2. The portable air conditioning system of claim 1, wherein the blower is battery powered.

3. The portable air conditioning system of claim 1, and further comprising a controller for allowing a user to adjust between at least two operating fan speeds of the blower.

4. The portable air conditioning system of claim 1, wherein the blower is a backwards curved impeller.

5. The portable air conditioning system of claim 1, and further comprising:
   a wedge configured to be inserted between the lid and the intake plenum to constrict one or more of the air exit channels.

6. The portable air conditioning system of claim 1, wherein the ducts are formed from thermally conductive plastic.

7. The portable air conditioning system of claim 1, wherein the ducts are metallic.

8. The portable air conditioning system of claim 1, wherein the bucket has an insulating material applied to a surface thereof.

9. The portable air conditioning system of claim 1 and further comprising:
   a drinking tube extending from the interior space of the bucket to the exterior of the bucket via the intake plenum.

10. A portable air conditioning assembly adapted to be used with a bucket, the assembly comprising:
    an intake plenum having an upper surface, a lower surface, and a plurality of air entry openings around an outer periphery thereof, the intake plenum configured to be removably connected to an upper peripheral edge of the bucket;
    a draft tube having a first leg configured to be coupled to a lower surface of the intake plenum and having a condensation trap disposed along a lower portion thereof;
    a lid dimensioned to be disposed on the upper surface of the intake plenum, the lid having a lower surface, wherein, when the lid is disposed on the intake plenum, an air exit channel is formed between the lower surface of the lid and the upper surface of the intake plenum; and
    a blower suspended from the lower surface of the lid and configured to blow air radially outwardly through the air exit channel.

11. The portable air conditioning assembly of claim 10, wherein, when the intake plenum is connected to the bucket and the lid is disposed on the intake plenum, a flow path is created from the air entry openings to the air exit channel.

12. The portable air conditioning assembly of claim 11, wherein, when the draft tube is coupled to the intake plenum, air flowing through the flow path must pass through the draft tube.

13. The portable air conditioning assembly of claim 11, wherein the blower is a backwards curved impeller and, when turned on, the blower causes ambient air outside the air entry openings to flow through the draft tube and into an interior space of the bucket.

14. The portable air conditioning assembly of claim 10, wherein the draft tube contains a plurality of internal fins.

15. The portable air conditioning assembly of claim 10, wherein the draft tube contains a plurality of pin fins therein.

16. A portable air conditioning assembly adapted to be used with a bucket, the assembly comprising:
    an intake assembly comprising:
       an intake plenum having an upper surface, a lower surface, and a plurality of air entry openings around an outer periphery thereof, the intake plenum configured to be removably connected to an upper peripheral edge of the bucket; and
       a plurality of draft tubes, each draft tube being configured to be coupled to a lower surface of the intake plenum and having a condensation trap on a lower portion thereof;
    a lid assembly comprising:

a lid dimensioned to be disposed on the upper surface of the intake plenum, the lid having a lower surface, wherein, when the lid is disposed on the intake plenum, an air exit channel is formed between the lower surface of the lid and the upper surface of the intake plenum;

a blower suspended from the lower surface of the lid and configured to blow air radially outwardly through the air exit channel; and a battery adapter configured to receive a battery to power the blower; and wherein, when the intake assembly is connected to the bucket and the lid assembly is disposed on the intake plenum, a flow path is created wherein air enters the plurality of air entry openings, passes through the draft tubes and into an interior of the bucket.

* * * * *